United States Patent [19]

Paladino et al.

[11] 4,285,557
[45] Aug. 25, 1981

[54] STORAGE TRAY FOR PACKAGED ARTICLES

[75] Inventors: Angelo Paladino, Brooklyn; Arnold Campolo, Jr., Staten Island, both of N.Y.

[73] Assignee: Palco Industries, Inc., Brooklyn, N.Y.

[21] Appl. No.: 75,839

[22] Filed: Sep. 14, 1979

[51] Int. Cl.³ .................. A47B 67/02; A47B 43/00; B65D 85/672

[52] U.S. Cl. .................... 312/246; 206/387; 206/565; 224/282; 312/13; 312/248; 220/21

[58] Field of Search .............. 206/387, 349, 354, 565; 220/21; 312/248, 246, 13; 224/282

[56] References Cited

U.S. PATENT DOCUMENTS

| | | | |
|---|---|---|---|
| 2,337,159 | 12/1943 | Friedl, Jr. | 312/248 |
| 3,151,761 | 10/1964 | Cloyd et al. | 220/21 |
| 3,443,851 | 5/1969 | Earl | 312/248 |
| 3,607,440 | 9/1971 | Daniel | 206/449 |
| 3,627,398 | 12/1971 | Reese | 206/387 |
| 3,647,076 | 3/1972 | Heimann | 206/454 |
| 4,105,270 | 8/1978 | Bergkamp et al. | 312/246 |

Primary Examiner—William T. Dixson, Jr.
Attorney, Agent, or Firm—Pennie & Edmonds

[57] ABSTRACT

A storage tray assembly for packaged articles where the tray has a plurality of parallel spaced upstanding panels adapted to engage a packaged article. The tray may be fixed on an angled bracket means or be slidably mounted in the bottom of a housing. The tray also may be pivotally mounted in the bottom of a housing and connected by levers to the housing such that when the front of the housing is opened, the tray is raised to a substantially tilted position and moved forward in the housing. Clamping means may be associated with each panel so as to resiliently engage a packaged article to prevent its rattling in the tray.

2 Claims, 8 Drawing Figures

STORAGE TRAY FOR PACKAGED ARTICLES

TECHNICAL FIELD

The invention relates to a storage tray for packaged articles such as tape cassettes where the tray has a plurality of panels so that the articles may be secured against movement in the tray. The tray may be mounted on a bracket where one part of the bracket is adapted to be affixed to a wall structure or the tray may be slidably mounted in the bottom of a housing which in turn is adapted to be affixed to a wall structure. The tray also may be horizontally mounted in the bottom of a housing by lever means whereby when the front of the housing is opened, the tray is raised to a substantially tilted position and moved forwardly within the housing.

BACKGROUND OF THE INVENTION

Tape decks included in automobiles are usually mounted below the dashboard in order that tape cassettes may be easily inserted into and removed from the tape deck. On long trips, it is often desired to carry a number of tape decks to provide entertainment throughout the trip. The cassettes are usually loosely carried in a box contained on the floor of the automobile or in a storage bin between front bucket seats. The cassettes often tend to become mixed up when loosely placed in a box preventing easy reading of their titles. Further the cassettes will rattle since no means are provided for preventing their jarring together thus producing an undesirable noise which interferes with the program being played by the tape deck.

It is therefore an object of our invention to provide for a storage tray assembly which may accommodate a plurality of packaged articles, as for example tape cassettes, and which include means in the tray to secure the packaged articles against movement and thus prevent rattling.

It is a further object of the invention to provide for a means whereby the tray may be conveniently mounted with respect to a wall structure, for example, the underside of the dashboard of an automobile so that titles on the packages are readily distinguishable.

DESCRIPTION OF THE INVENTION

Broadly a storage tray assembly constructed according to our invention has a plurality of spaced parallel upstanding panels positioned on the bottom of the tray where the panels extend across the width of the tray so that they may engage a packaged article contained between adjacent panels. Preferably a resilient clamping means is associated with each panel and which comprises a V-shaped structure which extends across the middle part of the panel wherein the apex of the V is integral with the panel and where the legs of the V of the configuration diverge and extend towards the bottom of the tray.

In one form of the invention the tray is mounted on an angled bracket where one leg of the bracket is adapted to engage a wall structure, as for example, the underside of an automobile dashboard.

In a further embodiment of the invention, the tray is slidably mounted in the bottom of a housing where the housing is adapted to be attached to a wall structure and where the tray may slide outwardly of the housing when packaged articles are to be removed or inserted into the tray.

In a still further form of the invention, the tray is mounted in a movable bottom portion of a housing. The bottom portion is pivotally connected at one end to the side walls of the housing and is pivotally connected at an opposite end to the tray. A crank arm slidably connects a side of the housing with a side of the tray. An upstanding front cover of the housing is connected to the tray such that when the cover is dropped or opened, the tray will pivot from a horizontal position to a substantially vertical position and move forward within the housing so as to move the packaged articles to a convenient position where identifying markings on the packages may be conveniently read and the packaged articles easily inserted into or removed from the tray.

BEST MODES FOR CARRYING OUT THE INVENTION

Figure 1:
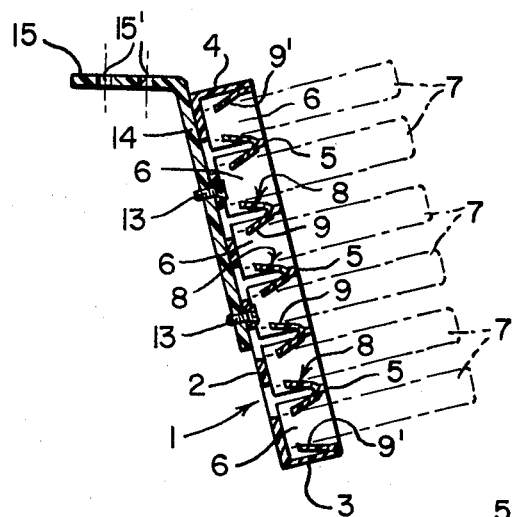
FIG. 1 is a side sectional view of a tray assembly constructed according to the invention including an angled mounting bracket.

Referring to FIG. 1, there is illustrated a storage tray 1 having a bottom 2 and end walls 3 and 4 upstanding from the bottom. A plurality of spaced separating panels 5 are connected to the bottom 2 so as to divide the tray 1 into a plurality of storage spaces 6 adapted to receive a plurality of packaged articles as, for example, tape cassettes 7.

Figure 2:
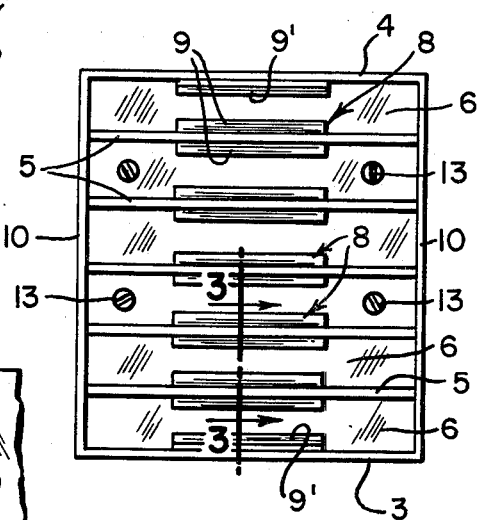
FIG. 2 is a front view of the tray assembly of FIG. 1.
Figure 3:
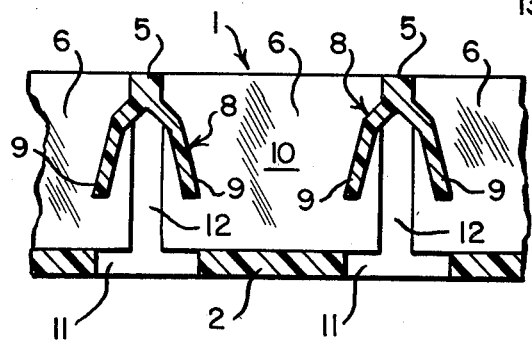
FIG. 3 is an enlarged sectional view of FIG. 2 taken along lines 3—3.

Each of the panels 5 has a clamping means 8 in the form of V-shaped structure which extends across the middle part of the panel as shown in FIG. 2 wherein the apex of a V is integral with a panel as shown in FIG. 3. The legs 9 of the V-shaped configuration diverge and extend towards the bottom of the tray so that the legs may resiliently engage an article placed in the space 6 to prevent the article from rattling. The end walls 3 and 4 include legs 9'.

The tray structure including the bottom 2, end walls 3 and 4, panels 5, clamping means 8 and side walls 10 comprises an integrally molded article. In order to assist in the formation of the mold cavity, a space 11 is included in the bottom 2 as well as a space 12 in the panels 5 such that a T-shaped male mold piece may be inserted into the mold cavity to assist in the formation of the clamping means 8.

As shown in FIG. 1, the tray 1 may be screwed by screws 13 onto an angled bracket 14, the upper leg 15 of which is adapted to be affixed to the underneath of a dashboard by means of screws, not shown, extending through holes 15'. Other means, such as a pressure-sensitive tape or a plastic adhesive means, such as sold under the tradename VELCRO could be used to affix the bracket to the underside of a wall means, for example, an automobile dashboard. As shown further in FIG. 1, by angling the bracket 14, the tray will be positioned so that titles on the cassettes will be readily visible and at the same time the cassettes may be easily placed onto and removed from the tray.

Figure 4:
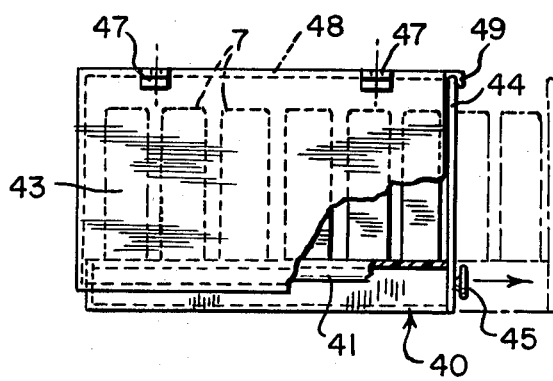
FIG. 4 is a broken side view of a tray assembly constructed according to the invention including a housing in which a tray is slidably mounted.
Figure 5:
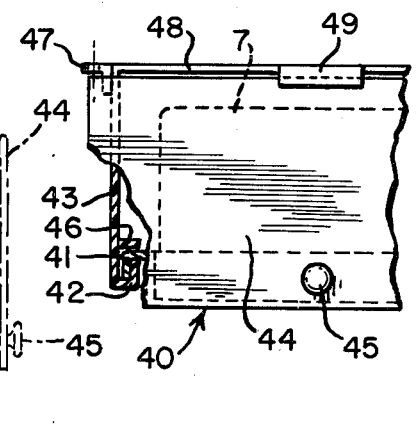
FIG. 5 is a partially broken front view of the tray and housing of FIG. 4.

Referring to FIG. 4, there is illustrated a further embodiment of the invention in which a tray 40 constructed similar to tray 1 of FIG. 1 has a slide portion 41 on both sides of the tray adapted to engage a second slide portion 42 forming part of the housing side walls 43. The tray has a front wall 44 including a knob 45 by which the tray may be pulled out of the housing along the slide 42. A guide 46 forms part of the housing side wall 43 and serves to engage the top part of the slide portion 41 when the tray is pulled out thus preventing the tray from falling from the housing. A bracket 47 is connected to each side wall 43 and provides a means by which the housing may be affixed to the underside of a dashboard.

A catch 49 is connected to the upper wall 48 of the housing so as to engage the top of the front wall 44 when the tray is slid completely within the housing to lock the tray in place. The catch comprises a flexible material so that by bending the catch upwardly and outwardly, the tray may be pulled from the housing by means of the knob 45. When the tray is fully pulled from the housing, all of the cassettes will be in a vertical position and their titles readily visible.

Figure 6:
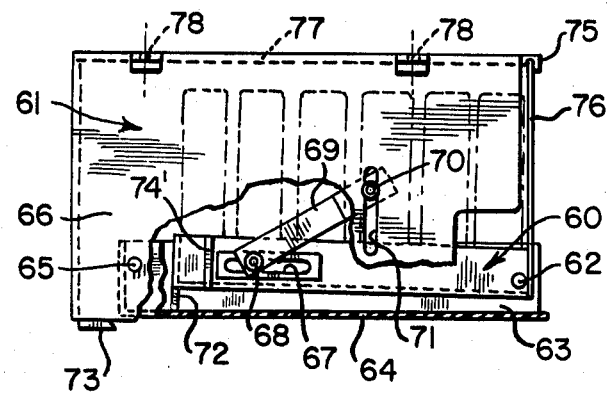
FIG. 6 is a side partial sectional view illustrating a tray assembly constructed according to the invention including a tray contained in a housing having a pivotal bottom portion in a closed position.
Figure 7:
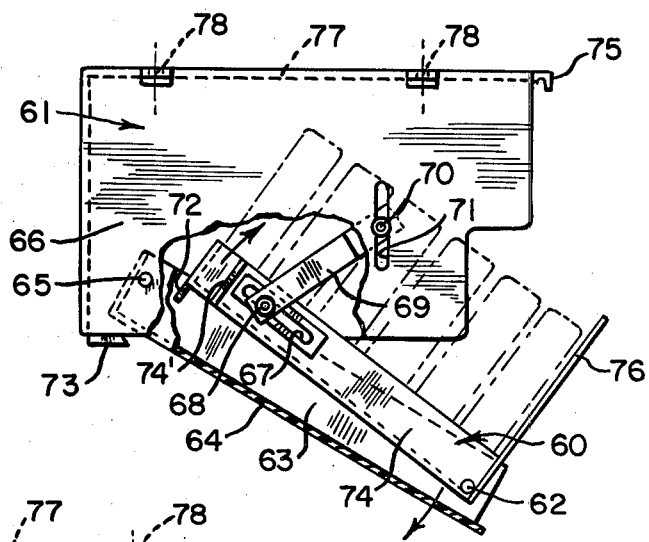
FIG. 7 is a view similar to FIG. 6 illustrating the tray in a partly open position.
Figure 8:
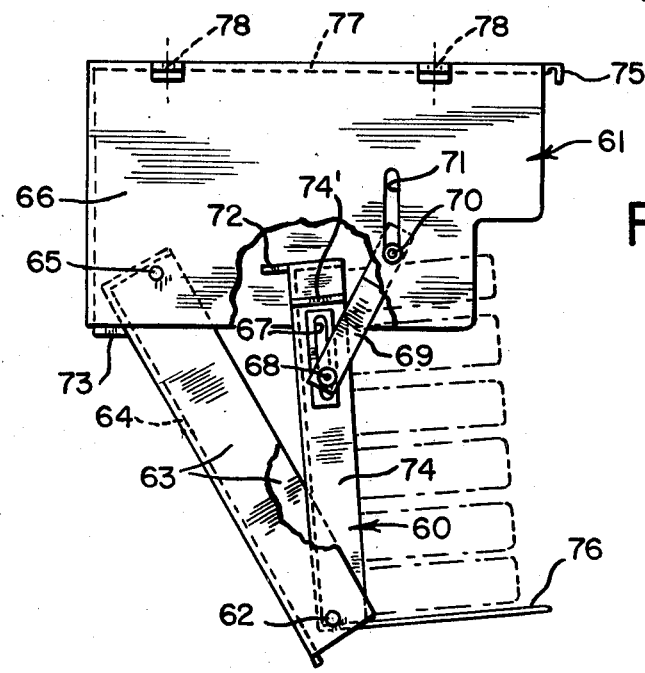
FIG. 8 is a view similar to FIG. 6 illustrating the tray in the fully opened position.

Referring to FIGS. 6–8 there is illustrated a still further embodiment of the invention in which a tray 60 is contained within a housing 61, such that when the tray is pulled from the housing, the front of the tray will rotate downwardly allowing the rear part of the tray to pivot forwardly so as to expose the cassettes. The tray is constructed following the general configuration of the tray of FIG. 1, that is the tray comprises a bottom wall, side walls, front and back walls and a plurality of separating panels whereby cassettes may be positioned in the tray. The tray may if desired include a clamping means with each panel. In addition the tray has pivots 62 at one end thereof engaging the side walls 63 of a bottom portion 64 of the housing where the bottom portion of the housing is free to rotate downwardly as shown in FIGS. 7 and 8. One end of the bottom portion 64 is pivoted by pins 65 to the side walls 66 of the housing. The tray 60 has a slot 67 therein in which a pin 68 is pivotable and slidable and which is connected to an arm 69. This opposite end of arm 69 in turn is connected to a pin 70 which is pivotable and slidable in slot 71 contained within the side wall of the housing.

The tray 60 includes a step portion 72 which engages the bottom portion 64 of the housing 61 as shown in FIG. 6 when the tray is in the closed position.

A stop 73 is connected to the side walls of the housing and extends across the bottom part of the housing so as to engage and prevent further movement of the bottom portion 64 when the tray is in the fully open position as shown in FIG. 8. In addition the side wall 74 of the tray has a stop 74' thereon which engages the arm 69 when the tray is in the fully open position as shown in FIG. 8 to prevent further movement of the tray in the forward position.

The housing has a catch 75 thereon adapted to engage the front wall 76 of the tray when in a closed position as shown in FIG. 6 to lock the tray in place. The catch may comprise an easily flexible material generally similar to that shown in FIG. 4.

The housing has an upper wall portion 77 including holes 78 therein by which the housing may be secured to the underside of a dashboard.

In operation, when it is desired to expose the cassettes, the catch 75 is lifted in the upward direction. The weight of the cassettes within tray 60 will then cause the lower portion 64 of the housing to drop and pivot about point 65. This in turn will allow the tray to pivot about point 62 and to raise to a tilted position by means of the pins connected to the arm 69 sliding in the slots 67 and 71 further moving the tray into a tilted upright position as shown in FIG. 8. In this position, the cassette titles will be readily visible and the cassettes may be easily placed into and removed from the tray.

It is thus seen that a storage tray assembly constructed according to our invention provides an easy convenient means by which articles, such as cassettes, may be readily stored underneath a wall means such as an automobile dashboard and where the tray is conveniently positioned so that titles on the articles are readily visible and so that the articles may be easily removed from and inserted into the tray.

We claim:

1. A storage tray assembly for packaged articles including a movable tray where said tray has a plurality of spaced parallel upstanding panels extending across a portion of the tray, a housing for said tray including side walls and a bottom portion pivotally connected at one end to a side wall and pivotally connected at its opposite end to an end of said tray, and a crank arm having one end pivotally connected to a side wall and an opposite end pivotally connected to a side of said tray whereby when said bottom portion is moved about its pivotal connection with said side walls, the ends of said crank arm will pivot with respect to said side walls and to said tray to cause said tray to move about its pivotal connection with said bottom portion from a horizontal position to a substantially vertical position.

2. A storage tray assembly according to claim 1 having in addition clamping means associated with each said panel adapted to resiliently engage a packaged article whereby the article will be secured between adjacent panels.

* * * * *